Patented Aug. 22, 1944

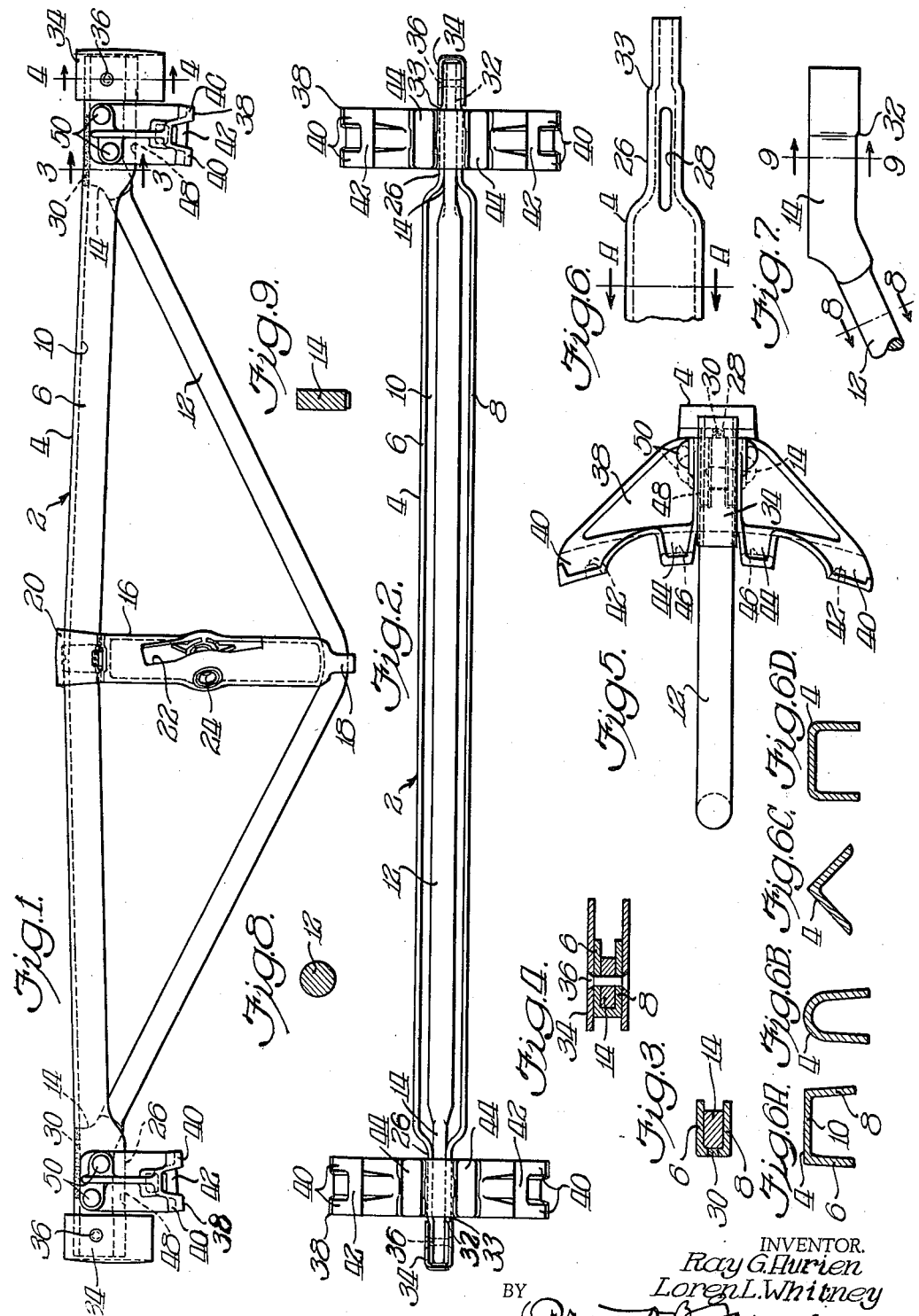

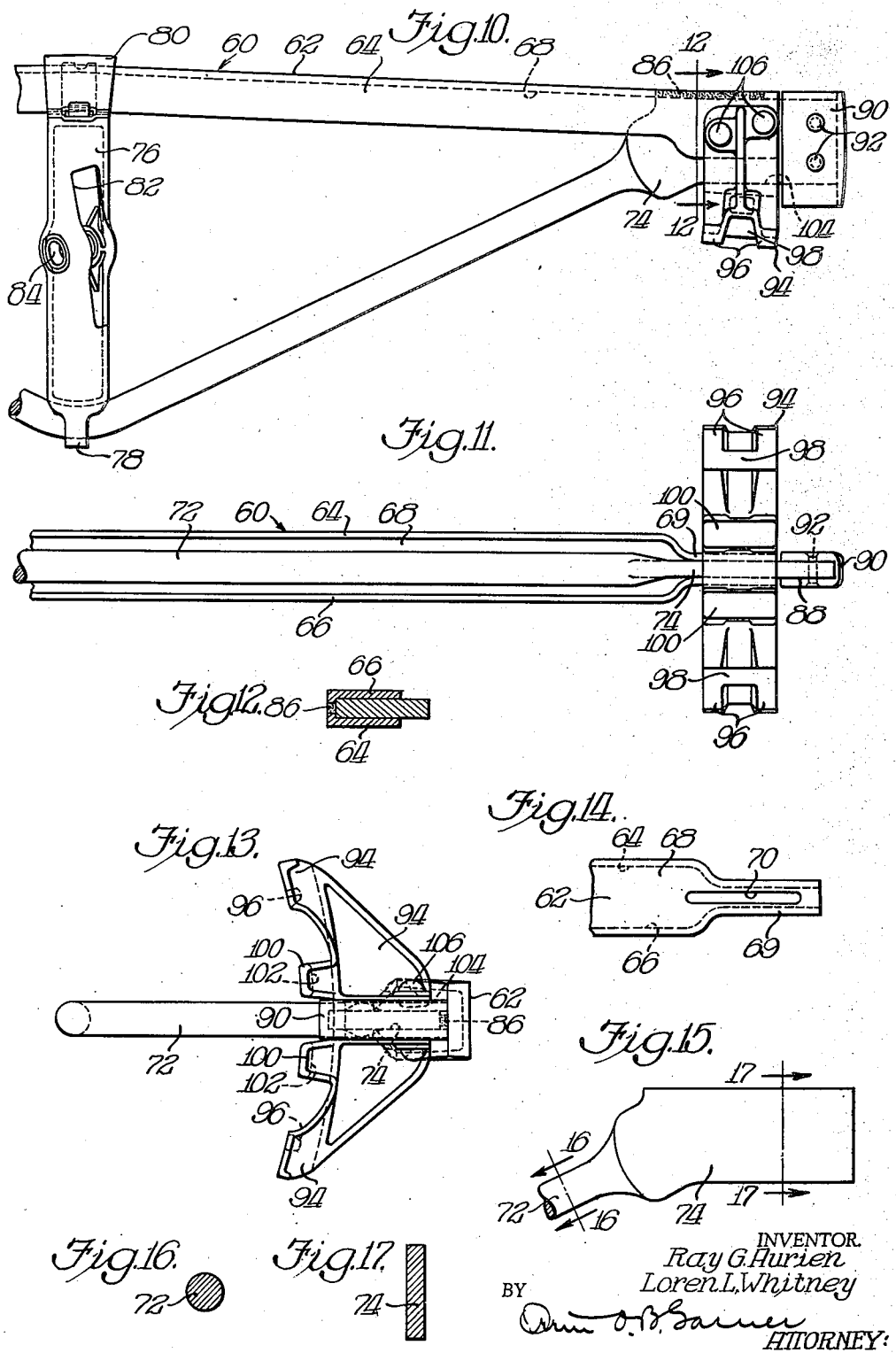

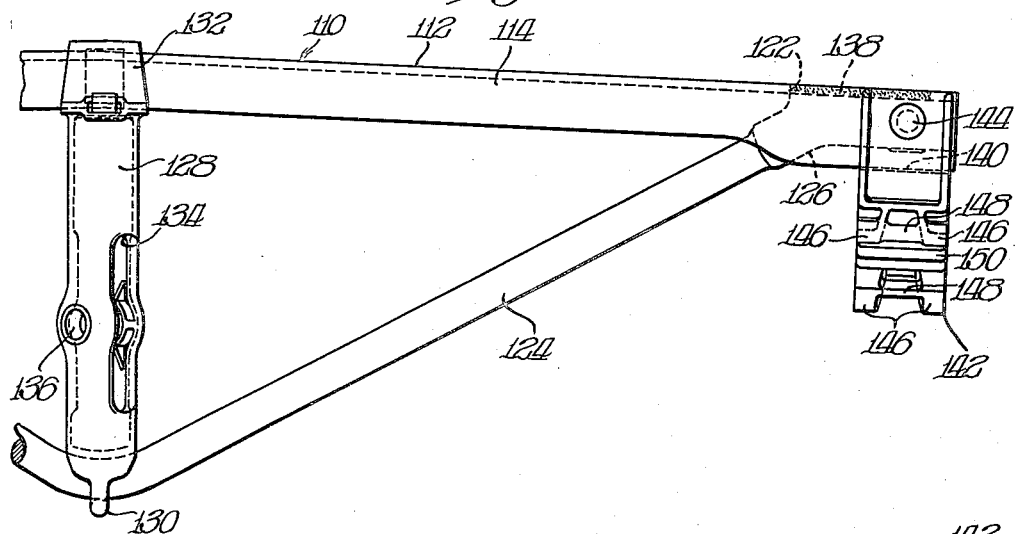
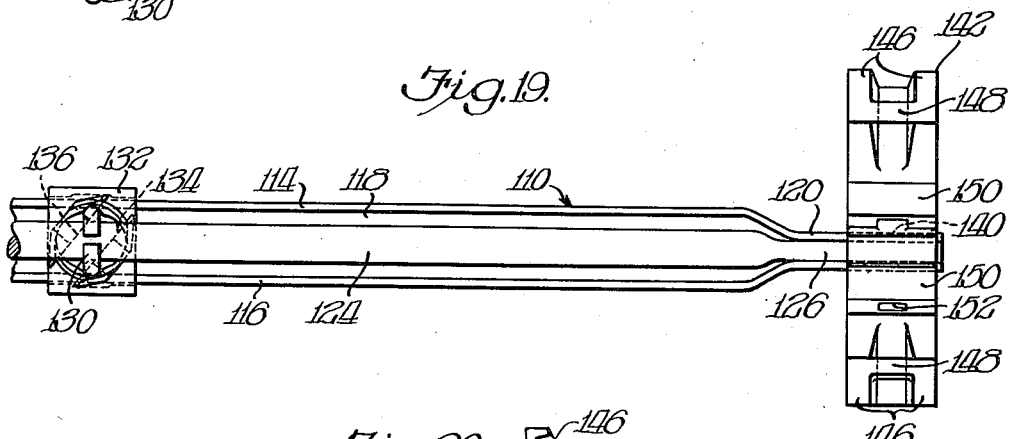
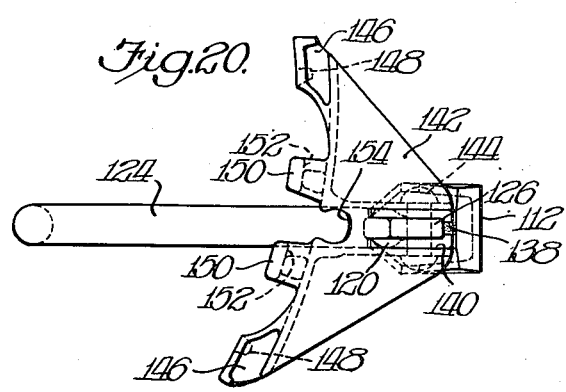

2,356,720

UNITED STATES PATENT OFFICE 2,356,720

BRAKE BEAM

Ray G. Aurien, Chicago, Ill., and Loren L. Whitney, Hammond, Ind., assignors to American Steel Foundries, Chicago, Ill., a corporation of New Jersey.

Application January 30, 1942, Serial No. 428,812

8 Claims. (Cl. 188—222)

Our invention relates to brake beams and more particularly to a truss type brake beam in which tension and compression members are secured to each other at the ends thereof and are connected intermediate said ends by a strut affording a fulcrum for an associated brake lever.

An object of our invention is to provide a truss type brake beam having a compression member comprising narrow end portions of U-section receiving therewithin the ends of a tension member, both of said members extending outwardly of the associated brake heads to afford seats for associated wear pads, said pads being formed and arranged for reception within guide brackets on an associated vehicle frame.

A further object of our invention is to provide a novel truss type brake beam and a novel method of assembly therefor, said beam having a compression member with end portions each comprising spaced top and bottom walls and a rear wall with a slot therethrough, said end portions receiving therewithin the ends of a tension member, said ends being welded to the edges of the associated slots.

Still another object of our invention is to provide a brake beam as above described in which the ends of the tension member project outwardly from the ends of the compression member to afford seats for associated wear pads, said pads being designed to fit within guide brackets on an associated vehicle frame.

In the drawings

Figure 1 is a top plan view of our novel brake beam.

Figure 2 is a front elevation thereof.

Figure 3 is a sectional view of the beam shown in Figures 1 and 2 in the vertical plane indicated by the line 3—3 of Figure 1, the brake head and wear pad being omitted, and Figure 4 is a further sectional view in the vertical plane indicated by the line 4—4 of Figure 1.

Figure 5 is a side elevation of the structure shown in Figures 1 and 2.

Figure 6 is a rear elevation of one end of the novel compression member utilized in the beam shown in Figure 1, and Figures 6A, 6B, 6C, and 6D are alternate sectional views in the plane indicated by the line A—A of Figure 6.

Figure 7 is a plan view showing the detail of one end of the novel tension member utilized in my arrangement, and Figures 8 and 9 are sectional views in the planes indicated respectively by the lines 8—8 and 9—9 of Figure 7.

Figures 10 to 16 inclusive show a modification of our novel brake beam, Figures 10 and 11 being respectively a fragmentary plan view and a fragmentary front elevation thereof, Figure 12 being a sectional view in the plane indicated by the line 12—12 of Figure 10, the brake head and wear pad being removed, Figure 13 being a side elevation of the structure shown in Figures 10 and 11, Figure 14 being a rear elevation of one end of the compression member shown in Figures 10, 11, and 13, and Figures 15, 16, and 17 being respectively a plan view of the tension member shown in Figures 10 to 12 and sectional views taken in the planes indicated by the lines 16—16 and 17—17 respectively of Figure 15.

Figures 18 to 20 inclusive show a further modification of our novel brake beam, Figure 18 being a fragmentary plan view thereof, Figure 19 a fragmentary front elevation, and Figure 20 a side elevation of the structure shown in Figures 18 and 19.

In each of said figures certain details may be omitted where they are more clearly seen in other views.

Describing our invention in detail and referring first to the modification shown in Figures 1 to 9 inclusive, our novel brake beam 2 comprises a compression member 4 of U-section and having top and bottom webs 6 and 8, and a rear web 10. The tension member 12 comprises a round bar, the upset ends 14, 14 of which are secured to said compression member as hereinafter more fully described.

Connected intermediate the ends of said members is a strut 16 comprising tension member securing means 18 of well known form, a yoke 20 receiving therewithin the compression member 4, and a slot 22 formed and arranged for the reception of an associated brake lever (not shown), said lever being secured within said slot as at 24 by a pin (not shown).

The compression member 4 has a narrow portion 26 at each end thereof with a slot 28 through the rear wall 10 thereof, and each end 14 of the tension member is received within the top and bottom webs 6 and 8 of the associated narrow portion of the compression member and is welded to the rear wall 10 thereof through the slot 28 as best seen in Figure 3. Both the tension and compression members are further narrowed as at 32 and 33 respectively to afford a seat for the U-shaped wear pad 34, said pad being secured to said members as at 36 and being formed and arranged for reception within a guide bracket on the associated truck frame (not shown).

Brake heads 38, 38 are secured to each end of the beam 2 as hereinafter more fully described, and each of said heads comprises spaced toe lugs 40, 40 at each end thereof joined by the bridge 42 and said head also comprises the intermediate lugs 44, 44 slotted as at 46, 46 (Figure 5), said lugs being adapted for securement thereto in the usual manner of an associated brake shoe (not shown). Said head also comprises a slot 48 formed and arranged for the reception of the associated end portion 26 of the compression member as well as the end 14 of the tension member secured thereto as heretofore described, and said head is secured to said members by rivets 50, 50.

It will be readily apparent that the compression member 4 intermediate the ends thereof may be of any of the sections shown in Figures 6A to 6D inclusive, each of these figures being an alternate view in the plane indicated by the line A—A of Figure 6. In the modification shown in Figures 1 to 6, the compression member is of channel section as shown in Figure 6A.

In assembling my novel beam, it will be understood that the compression member 4 is secured to the strut 16 by means of the yoke 20 before the formation of the end portions 26, 26, said end portions being formed in any convenient manner. Thereafter, the tension member 12 is connected to said strut at 18 in the usual manner and each end 14 of the tension member is received between the webs 6 and 8 of the associated end portion 26 and abuts the web 10 thereof, and thereafter the end 14 is welded to the web 10 through the slot 28. After the welding of the tension and compression members, the brake heads 38, 38 are positioned with the slots 48, 48 receiving therewithin the end portions 26, 26 of the compression member and the end portions 14, 14 of the tension member secured to the portions 26, 26 as heretofore described. The brake heads 38, 38 are then secured by riveting as at 50, 50. The wear pads 34, 34 may be fitted over the portions 33, 33 of the compression member and secured as at 36, 36 either before or after the assembling of the brake heads.

Figures 10 to 17 inclusive show another modification of our invention. The brake beam generally designated 60 comprises a compression member 62 having top and bottom webs 64 and 66 respectively and a rear web 68, said compression member being narrowed as at 69 and slotted as at 70 (Figure 14) as in the previous modification. The tension member 72 comprises a round bar with an upset portion 74 at each end thereof received between the top and bottom webs 64 and 66 of the adjacent end portion 69 and secured thereto as hereinafter more fully described.

A strut 76 is connected intermediate the ends of said members and comprises a tension member opening 78, a yoke 80 receiving therewithin the compression member in usual manner, and a slot 82 formed and arranged for the reception of an associated brake lever, said lever being secured therewithin as at 84.

It may be noted that each end portion 74 of the tension member is wider than in the previous modification and is welded as at 86 to the rear wall 68 of the associated end portion 69 through the slot 70 in said rear wall 68. It may also be noted as best seen in Figure 11 that the compression member 62 is terminated short of each end of the tension member which projects outwardly of the associated brake head to afford a seat as at 88 for a U-shaped wear pad 90, said pad being secured thereto as at 92, 92 and being formed and arranged for reception within an associated bracket on a vehicle frame (not shown).

Each brake head 94 comprises the spaced toe lugs 96, 96 at each end thereof and joined by the bridge 98 and said head also comprises the intermediate lugs 100, 100 slotted as at 102, 102 (Figure 13), said lugs being formed and arranged for securing means for an associated brake shoe (not shown) in usual manner, and each of said heads 94, 94 also comprises a slot 104 formed and arranged for the reception of the associated end portion 69 of the compression member 62, said end portion and the associated end 14 of the tension member being secured within said slot 104 by the rivets 106, 106.

It will be understood that the modification shown in Figures 10 to 17 may comprise a compression member having intermediate the ends thereof any of the sections shown in Figures 6A to 6D inclusive.

Figures 18 to 20 inclusive show still another modification of our invention in which the brake beam generally designated 110 comprises a compression member 112 having spaced top and bottom webs 114 and 116 joined by the rear vertical web 118, said member being narrowed as at 120 at each end thereof and slotted as at 122 (Figure 18) as in the previous modifications and for a similar purpose. The tension member 124 comprises a round bar with an upset portion 126 at each end thereof. A strut 128 is connected between said members and comprises a jaw 130 receiving the tension member 124 and a yoke 132 within which may be received the compression member 112 in usual manner, and said strut also comprises a slot 134 formed and arranged for the reception of an associated brake lever, said lever being secured therewithin as at 136.

Each end portion 126 is received within the associated end portion 120 of the compression member 112 and is welded as at 138 to the slot 122 in the rear web 118 of the compression member 112 as may best be seen in Figure 18, and each narrow end portion 120 of the compression member is received within a slot 140 on the associated brake head 142 and is secured thereto as at 144. Each brake head 142 comprises at each end thereof the spaced toe lugs 146, 146 joined by the bridge 148, and said head also comprises the intermediate lugs 150, 150, said lugs being slotted as at 152, 152 in usual manner. Each brake head 142 also comprises an aperture 154 formed and arranged for the reception of an associated brake hanger (not shown).

It will be understood that as in the previous modifications, the lugs 146, 146 and 150, 150 afford securing means for an associated brake shoe in usual manner. It will also be understood that in the modification shown in Figures 18 to 20 inclusive the compression member intermediate the ends thereof may be of any of the sections shown in Figures 6A to 6D inclusive as in the previous modifications.

In assembling the beams shown in Figures 10 to 17 and Figures 18 to 20 respectively, a procedure is followed similar to that described for the modification shown in Figures 1 to 9.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In a brake beam, a compression member comprising relatively narrow end portions of U section, each of said end portions having top and bottom flanges and a rear web with a horizontal slot therein, a tension member having extremities received between said flanges in abutment with the adjacent webs, welding means in said slots securing said tension and compression members, and brake heads fixed on the ends of said beam, said tension member extremities extending outwardly of said head beyond said compression member for connection to associated support means.

2. In a brake beam, a compression member having U-section end portions merging into still narrower extremities, each of said end portions having top and bottom flanges and an intermediate web with a slot therethrough, a tension member having complementary upset ends received within said end portions and welded thereto through said slots, a strut connected between said members, brake heads mounted on the ends of said beam inwardly of said extremities, and wear plates on said extremities for cooperation with associated guide and support means.

3. In a brake beam, a compression member having relatively narrow U-section end portions terminating in extremities still further restricted, each end portion having a top flange, a bottom flange and an intermediate vertical web with a horizontal slot, a tension member having complementary upset ends received within said end portions and welded thereto through said slots, brake heads secured on the ends of said beam inwardly of said restricted extremities, and wear plates fixed on said extremities adjacent said heads but spaced therefrom for cooperation with associated support and guide means.

4. In a brake beam, a compression member comprising end portions of U section with top and bottom flanges and an intermediate web having a horizontal slot, a tension member with ends upset for complementary engagement with the end portions of said compression member and secured therewithin by welding through said slots, and brake heads fixed on the ends of said beam, said tension member ends extending beyond said brake heads for connection to associated support and guide means.

5. In a compression member for a truss type brake beam, a metallic member having a relatively narrow end portion of U-section for reception within the recess of an associated brake head, and an extremity on said portion relatively narrow with respect thereto and affording a seat for an associated wear pad.

6. In a brake beam, a compression member comprising end portions of U section with top and bottom flanges and an intermediate web having a horizontal slot, a tension member with ends upset for complementary engagement with the end portions of said compression member and secured therewithin by welding through said slots, brake heads fixed on the ends of said beam, said tension member ends extending beyond said heads, and supporting wear means spaced from said heads for cooperation with associated support and guide means.

7. In a brake beam, a compression member having at each end thereof a relatively narrow end portion of U-section comprising a still narrower extremity, a tension member having at each end thereof an end portion complementary to and received within the associated end portion of the compression member, means securing the end portions of the compression member to the end portions of the tension member, brake heads secured to the associated end portions, and a wear pad embracing each of said extremities and secured thereto.

8. In a brake beam, a compression member having at each end thereof a relatively narrow end portion of U-section comprising a still narrower extremity, a tension member having at each end thereof an end portion complementary to and received within the associated end portion of the compression member, means securing the end portions of the compression member to the end portions of the tension member, brake heads secured to the associated end portions, and a wear pad embracing each of said extremities and secured thereto, the means securing each wear pad being independent of the means securing the adjacent brake head to said beam.

RAY G. AURIEN.
LOREN L. WHITNEY.